United States Patent Office 3,499,931
Patented Mar. 10, 1970

3,499,931
PROCESS FOR THE SEPARATION OF A MIXTURE OF PRIMARY ALKANOLAMINES AND SECONDARY ALKANOLAMINES
John B. Tindall, Terre Haute, Ind., assignor to Commercial Solvents Corporation, a corporation of Maryland
No Drawing. Filed Oct. 13, 1967, Ser. No. 675,046
Int. Cl. C07c 89/04
U.S. Cl. 260—584                                6 Claims

ABSTRACT OF THE DISCLOSURE

A process for the separation of a mixture of primary alkanolamines and secondary alkanolamines by reacting the mixture with an alkyl nitrite to form, as new compositions, N-substituted nitrosoalkanolamines, separating the primary alkanolamine by distillation, and recovering the secondary alkanolamine from the nitrosoalkanolamine by hydrogenation or utilizing the latter to produce the corresponding alkanol-hydrazine.

SUMMARY OF THE INVENTION

This invention relates to a process for separation and purification of a mixture of primary and secondary alkanolamines. In a particular aspect, it relates to separation and purification of a mixture of alkanolamines by treating the mixture with an alkyl nitrite.

Alkanolamines of the general formula

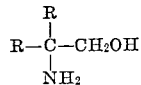

where R can be hydrogen, alkyl, or hydroxyalkyl are useful in a variety of ways, one of which is as a raw material for N-substituted alkanolamines, which also have many uses, one of which is in resin synthesis.

Secondary and tertiary amines and alkanolamines frequently occur as impurities in these primary alkanolamines. Also, when the latter are employed for preparation of N-substituted amines or alkanolamines, the resulting product is usually a mixture of primary, secondary and tertiary alkanolamines. These mixtures are often difficult to separate by fractional distillation because their boiling points are often close to one another.

It is known that secondary alkyl and aryl amines can be separated from a mixture of primary and tertiary amines by treatment with nitrous acid to form an N-nitrosoalkylamine with the secondary amine. In this reaction, the primary amine is decomposed and the tertiary amine is unaffected. It is also known that alkyl nitrites are a convenient source of nitrous acid in such reactions, although sodium nitrite is the usual reagent.

It is an object of this invention is provide a new process for the separation and purification of primary and secondary alkanolamines.

It is another object of this invention to provide a process for the separation of a mixture of primary and secondary alkanolamines by treatment with an alkyl nitrite.

Still another object of this invention is to provide new compositions of the class of N-substituted nitrosoalkanolamines.

Other objects and advantages of this invention will be obvious to those skilled in the art from the description herein.

A process has now been discovered for separating N-mono-substituted secondary alkanolamines from a mixture with primary alkanolamines—and tertiary when present—by treating the mixture with an alkyl nitrite whereby the N-mono-substituted secondary alkanolamine is converted to the high-boiling nitroso derivative. Surprisingly, the primary alkanolamine does not react with the alkyl nitrite as do non-hydroxy amines and, along with the tertiary alkanolamine when present, is separated by any suitable means. The nitroso derivative is then discarded, or when preferred, the N-mono-substituted alkanolamine is recovered from the nitroso derivative by hydrogenolysis, or, alternatively, the nitroso compound is reduced to the corresponding hydrazine.

DETAILED DESCRIPTION

The process of this invention is generally useful for separating closely boiling mixtures of alkanolamines, including primary, secondary and tertiary alkanolamines. The primary alkanolamines correspond generally to the formula

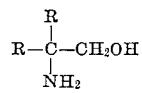

where R is hydrogen, or an alkyl or hydroxyalkyl radical of from 1 to 3 carbon atoms. Such compounds include, but are not limited to, ethanolamine; 2-amino-1-propanol; 2-amino-2-methyl - 1 - propanol; 2-amino-1-butanol; 2-amino-2-ethyl-1-propanol; 2-amino - 2 - methyl-1-butanol; 2-amino-1-pentanol; 2-amino - 2 - methyl-1,3-propanediol; 2-amino-2-ethyl-1,3-propanediol; and 2-amino-2-hydroxymethyl-1,3-propanediol.

The secondary alkanolamines correspond generally to the formula

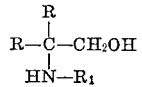

where R has the same meaning defined above and $R_1$ is alkyl or hydroxyalkyl of from 1 to 4 carbon atoms. Generally, but not necessarily, the secondary alkanolamines will be alkyl or hydroxyalkyl derivatives of the primary amines resulting from treatment of the primary amine with an alkylating agent.

Formaldehyde is a common alkylating agent for preparing secondary and tertiary alkanolamines from primary alkanolamines, but others, such as alkyl halides and higher aldehydes, e.g. acetaldehyde, propionaldehyde, butyraldehyde, are also known. Mixtures of alkanolamines are also obtained from other processes, such as by reacting alkylene oxides with ammonia.

The alkyl nitrite suitable for use in the process of this invention can be any of the lower alkyl nitrites, i.e. alkyl nitrites of from 1 to 6 carbon atoms. Higher molecular weight nitrites can also be used, but their greater cost tends to make them undesirable. The preferred nitrites are propyl and butyl nitrites because of their ease of handling and reasonable cost, and n-butyl nitrite is particularly preferred. The amount of alkyl nitrite is selected to provide a mole ratio of about 1–2, preferably 1.1–1.8, moles per mole of secondary alkanolamine. The concentration of secondary alkanolamine can be readily determined by any suitable method, many of which are known. Excess alkyl nitrite is conveniently recovered from the reaction mixture by fractionation.

The reaction of the secondary alkanolamine with alkyl nitrite is conducted at a temperature and for a length of time suitable to effect the conversion of the secondary alkanolamine to the N-substituted nitrosoalkanolamine. Preferably, a temperature of from 25 to 150° C. is employed for a reaction period of about 15 minutes to 24 hours. The reaction is conveniently conducted in a distillation kettle equipped with a fractionating column and a takeoff head, and the heating period is conducted at reflux temperature.

When the reaction is determined to be complete, the mixture is fractionated to remove the distillable primary and tertiary alkanolamines, the excess nitrite, if any, and the alkanol formed by the reaction of secondary alkanolamine with the alkyl nitrite. The excess alkyl nitrite is recovered for re-use when preferred.

When relatively non-volatile primary alkanolamines, e.g. the diols and the triol, are present, distillation is not a satisfactory method of separation. One suitable method is by ion exchange whereby the mixture of primary alkanolamine, the nitroso compound, and tertiary alkanolamine, if any, along with excess alkyl nitrite and impurities, if any, are contacted with a cationic ion-exchange resin, many of which are known. Generally, the mixture to be separated is dissolved in a suitable solvent, e.g. water or lower alkanol, i.e. methanol. The resin retains the primary and tertiary amines and alkanolamines and the nitroso compound remains in solution. Such ion-exchange treatment and recovery of primary and tertiary amines therefrom are conducted according to any suitable method, many of which are known.

After separation of the primary and tertiary alkanolamines by distillation or ion exchange-treatment, the remaining nitrosoalkanolamine is discarded when it is of little value. Otherwise, it is re-converted to the secondary alkanolamine or used to prepare the corresponding substituted hydrazine. To reconvert the nitroso compound to the secondary alkanolamine, it is dissolved in methanol; hydrogenation catalyst, 5–20%, preferably about 5% based on the weight of the nitroso compound, is added; and the mixture is transferred to a high-pressure hydrogenation apparatus. The substituted nitrosoalkanolamine is then hydrogenated under hydrogenating conditions, to reconvert it to the secondary alkanolamine which is purified by any suitable means, e.g. by fractionation or re-crystallization. The hydrogenation step is conducted at elevated temperatures and pressures in accordance with procedures known in the art, and any suitable hydrogenation catalyst may be used. Such catalysts include Raney nickel, reduced nickel, palladium and platinum, and Raney nickel is preferred.

In one embodiment of this invention, the substituted nitrosoalkanolamine is used as a raw material for the preparation of N-substituted-N-hydroxyalkylhydrazines by partial reduction in accordance with methods known in the art, i.e. in accordance with U.S. Patent 2,947,785. Such compounds correspond to the formula

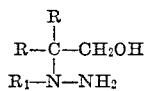

where R and $R_1$ have the same meaning set forth above. These N-substituted hydroxyalkylhydrazines have utility as fuels for rocket propellants, gas absorbents, antioxidants, reducing agents, and as sensitizers for nitromethane explosive compositions.

The following examples further illustrate the process of this invention.

Example 1.—Purification of N-methyl-2-amino-1-propanol

A mixture, 100 g., containing N-methyl-2-amino-1-propanol (41% wt.), 2-amino-1-propanol (59% wt.) was placed in a reaction vessel equipped with a fractionating column and a takeoff head, and butyl nitrite, 70 g., was added, and the mixture was heated under total reflux for 30 minutes. The reaction mixture was then fractionated to yield three fractions and a residue. The first fraction, 65 g., B.P. to 98° C. at 40 mm., consisted of butanol and unreacted butyl nitrite. The second fraction, 30 g., B.P. 75–80° C. at 15 mm., was 2-amino-1-propanol. The third fraction, 7.3 g., unidentified, had a B.P. 80–145° at 15 mm.

The residue, 48 g., was dissolved in methanol, Raney nickel catalyst, 10 g., was added and the mixture was transferred to a hydrogenating bomb. Hydrogenation was effected at a pressure of 1000 lb. p.s.i.g. of hydrogen for a reaction period of 1 hour at 100° C.

The bomb product was fractionated to yield 33 g. of product having the following analysis:

| | |
|---|---|
| N-methyl-2-amino-1-propanol _____percent wt__ | 97.7 |
| 2-amino-1-propanol _____ | 1.9 |
| Equivalent weight _____ | 89.36 |
| Density at 25° C. _____ | 0.9226 |
| Index of refraction, $n_D$ at 25° C. _____ | 1.4407 |

The yield was 80.5% based on the amount of N-methyl-2-amino-1-propanol in the starting material.

Example 2.—Purification of N-methyl-2-amino-1-butanol

The experiment of Example 1 was repeated using 166 g. of a mixture having the following composition:

| | Percent |
|---|---|
| N-methyl-2-amino-1-butanol _____ | 37.9 |
| 2-amino-1-butanol _____ | 61.5 | and using 85 g. of butyl nitrite. The mixture was refluxed for 15 minutes at 75–117° C. and fractionated. A residue of 68 g. of N-nitroso-N-methyl-2-amino-1-butanol was obtained which was hydrogenated and purified according to the procedure of Example 1 to yield 54.5 g. of N-methyl-2-amino-1-butanol of 98.6% purity and having the following properties:

| | |
|---|---|
| Boiling range at 20 mm. _____° C__ | 79–82 |
| Equivalent weight _____ | 103.18 |
| Density at 25° C. _____ | 0.9140 |
| Index of refraction, $n_D$ at 25° C. _____ | 1.4445 |

The yield was 86.5% based on the weight of N-methyl-2-amino-1-butanol in the starting material.

Example 3.—Purification of N-methyl-2-amino-2-methyl-1-propanol and preparation N-methyl-N-nitroso-2-amino-2-methyl-1-propanol A mixture, 243 g. of 2-amino-2-methyl-1-propanol, 54%, and N-methyl-2-amino-2-methyl-1-propanol, 46%, was purified in accordance with the general procedure of Example 1 using 175 g. of butyl nitrite. The mixture was heated to reflux, liquid temperature 71–100° C. and fractionated through a fractionating column at 16 mm. pressure. The following fractions were collected:

| Fraction No. | Vapor temp. (° C.) | Weight (g.) |
|---|---|---|
| 1 | 38–40 | 75.7 |
| 2 | 40–73.5 | 16.0 |
| 3 | 73.5–76 | 126.5 |
| 4 | 76–141 | 3.0 |
| 5 | 146–147 | 129.5 |
| 6 | Residue | 3.0 |

Fraction 3 was colorless and crystallized at room temperature. By gas chromatographic analysis it was determined to be 97.4% by weight 2-amino-2-methyl-1-propanol, equivalent weight 90.99 (theoretical 89.14).

Fraction 5 was a yellow liquid, determined to be N-methyl-N-nitroso-2-amino-2-methyl-1-propanol analyzing 20.62% by weight nitrogen (theoretical 21.1%).

A portion, 125 g., of the nitroso compound was dissolved in 500 ml. of methanol, and 7 g. Raney nickel catalyst was added. The mixture was placed in a hydrogenation bomb and was hydrogenated at 100° C. at a pressure of 1000 p.s.i.g. of hydrogen for 45 minutes. The bomb was cooled and the contents were fractionated. The fraction collected at 92° C. at 40 mm. pressure was determined to be N-methyl-2-amino-2-methyl-1-propanol, and the yield was 97.5% based on the nitroso compound. The equivalent weight was 102.96, M.P. 41.5° C., purity by gas chromatograph 98.8% by weight.

Example 4.—Purification of 2-amino-2-methyl-1-propanol

A sample of commercial grade 2-amino-2-methyl-1-propanol was determined to have a purity of 94.9% by gas chromatography. To a reaction vessel was delivered 504 g. of the material, and 52 g. of butyl nitrite was added.

The mixture was heated to 120° C., set aside overnight, and then was fractionated through a ¾ x 24 inch fractionation column. A 420 g. cut was taken at 91–92° C. at 40 mm. pressure. It analyzed 99.9% 2-amino-2-methyl-1-propanol, yield 88% based on the amount present in the crude material.

Example 5

A quantity of N-methyl-N-nitroso-2-amino-2-methyl-1-propanol prepared according to the procedure of Example 3 is reduced to N-methyl-N-(hydroxy-tert. butyl)hydrazine, according to the general procedure of U.S. Patent 2,947,785, which procedure is incorporated herein by reference thereto. The resulting hydroxyalkyl substituted hydrazine is employed as a sensitizing agent for nitromethane by incorporating 8% by weight therein. The resulting sensitized nitromethane is useful as an explosive composition and can be detonated by the shock of a No. 8 electric blasting cap.

Example 6

The experiment of Example 1 is repeated except that a mixture of monoethanolamine and diethanolamine are substituted for N-methyl-2-amino-1-propanol and 2-amino-1-propanol. The alkanolamines are separated and recovered in high purity and good yield.

Example 7

Commercial grade 2-amino-2-methyl-1,3-propanediol (AMPD) having a minor proportion of N-monomethyl-2-amino-2-methyl-1,3-propanediol as an impurity is reacted with butyl nitrite in a ratio of about 1.5 moles per mole of secondary alkanolamine to form the nitroso derivative thereof. The resulting mixture is contacted with a bed of cationic ion-exchange resin sufficient to absorb the primary alkanolamine but without effect on the nitroso compound. The primary alkanolamine is then recovered from the resin and is determined to be nearly free from secondary alkanolamine.

Example 8

The experiment of Example 7 is repeated except that tris(hydroxymethyl)aminoethane contaminated with N-methyl-tris(hydroxymethyl)aminoethane is substituted for 2-amino-2-methyl-1,3-propanediol. Good separation of the secondary from the tertiary alkanolamine is obtained.

Example 9

A reaction mixture, 71.5 g., containing 37 mole percent of 2-monomethylamino-2-methyl-1,3-propanediol, 38 mole percent of 2-dimethylamino-2-methyl-1,3-propanediol and 25% of 2-amino-2-methyl-1,3-propanediol was refluxed with 75 g. of butyl nitrite and 50 ml. of butanol for 30 minutes. The resulting solution was concentrated from a boiling water bath at 15 mm. to remove solvents. The residue was dissolved in water and passed through a column of cationic ion-exchange resin Amberlite IR 120 in order to remove basic materials. The column was rinsed with methanol and the combined effluent and rinse were hydrogenated over Raney nickel catalyst at a temperature of 100° C. and at a hydrogen pressure of 1000 p.s.i.g. The reaction produce was evaporated to dryness at 15 mm. at 100°. The crystalline residue weighed 29 g. It was recrystallized from a mixture of butanol and toluene. The crystals had an equivalent weight of 118.6 and melted at 84.5°. Identity was confirmed by a nuclear magnetic resonance spectrum.

Example 10

Pure 2-monomethylamino-2-ethyl-1,3-propanediol was separated according to the method of Example 9 from a mixture of 2-monomethylamino-2-ethyl-1,3-propanediol, 2-dimethylamino-2-ethyl-1,3-propanediol and 2-amino-1,3-propanediol. After hydrogenation and recrystallization from toluene, a product was obtained having a neutral equivalent of 132.0, theoretical 133.1, melting point 78.9° C. The product was confirmed by NMR spectrum to be 2-monomethylamino-2-ethyl-1,3-propanediol.

Example 11

A mixture, 107 g., of 62% tris(hydroxymethyl)aminomethane and 38% tris(hydroxymethyl)monomethylaminomethane was dissolved in 600 ml. of methanol and 2 moles of methyl nitrite were passed in at 40°. The mixture was heated to reflux for a few minutes, then was passed through Amberlite IR 120 resin to remove basic materials. The resin was then washed with water and eluted with ammonium hydroxide. Evaporation of the effluent left 63 g. of tris(hydroxymethyl)aminomethane of high purity.

The non-basic effluent from the passage of the alkanolamines through the resin was hydrogenated over sponge nickel catalyst at 100°. Evaporation of the solution left 40 g. of crystalline solid, neutral equivalent 135.92, melting range 148.5–151° C., which was determined to be tris(hydroxymethyl)monomethylaminomethane. The structure was confirmed by nuclear magnetic resonance spectrum.

What is claimed is:

1. A process for the separation of a primary alkanolamine corresponding to the formula

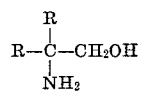

where R is hydrogen or an alkyl or hydroxyalkyl radical of from 1 to 3 carbon atoms, from a mixture with a secondary alkanolamine corresponding to the formula

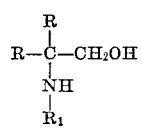

where $R_1$ is an alkyl or hydroxyalkyl of from 1 to 4 carbon atoms, comprising reacting said mixture with an alkyl nitrite of from 1 to 6 carbon atoms in a mole ratio of from about 1.1 to 1.8 of said alkyl nitrite to 1 mole of said secondary alkanolamine at a temperature of from 25 to 150° C., to effect conversion of said secondary alkanolamine to the corresponding N-substituted-N-nitrosoalkanolamine, separating said primary alkanolamine therefrom, and reducing said N-substituted-N-nitrosoalkanolamine to said N-substituted secondary alkanolamine.

2. The process of claim 1 wherein said alkyl nitrite is butyl nitrite.

3. The process of claim 1 wherein the primary alkanolamine is separated by fractional distillation.

4. The process of claim 1 wherein the primary alkanolamine is separated by contact with a cationic ion-exchange resin.

5. The process of claim 1 wherein said primary alkanolamine is 2-amino-2-methyl-1-propanol and said secondary alkanolamine is N-methyl-2-amino-2-methyl-1-propanol.

6. The process of claim 1 wherein said primary alkanolamine is 2-amino-1-butanol and said secondary alkanolamine is N-methyl-2-amino-1-butanol.

References Cited

UNITED STATES PATENTS

| | | | |
|---|---|---|---|
| 2,950,954 | 8/1960 | Mador et al. | 23—190 |
| 2,960,536 | 11/1960 | Getz. | |
| 2,979,505 | 4/1961 | Tuemmler et al. | 260—584 X |

(Other references on following page)

OTHER REFERENCES

Ogimachi et al., Chemical Abstracts, vol. 55, 1961, page 22,096h.

Preussmann, Chemical Abstracts, vol. 57, 1962, page 7087i.

Bergel et al., Chemical Abstracts, vol. 58, 1963, page 13,952c.

Thomas et al., Chemical Abstracts, vol. 61, 1964, page 12,436e.

CHARLES B. PARKER, Primary Examiner

R. L. RAYMOND, Assistant Examiner

U.S. Cl. X.R.

149—89, 109; 252—403; 260—583